Oct. 17, 1950  S. E. BLEWETT  2,526,114
WEATHER INDICATOR
Filed Aug. 4, 1947

INVENTOR
Stephen E. Blewett
BY
ATTORNEYS

Patented Oct. 17, 1950

2,526,114

UNITED STATES PATENT OFFICE 2,526,114

WEATHER INDICATOR

Stephen E. Blewett, Altadena, Calif., assignor of one-half to Stephen N. Blewett, Stockton, Calif.

Application August 4, 1947, Serial No. 766,062

1 Claim. (Cl. 40—70)

This invention is directed to, and it is an object to provide, a novel portable or pocket device whereby a weather forecast, for several days, may be visually reflected for ease of reference.

Another object of the invention is to provide a device, as above, which also includes novel adjustable means to evidence a forecast of temperature; existing weather elements, such as snowdepth for winter sports; rain gauge readings; or the like.

A further object of the invention is to provide a weather indicator which is arranged so that the weather forecasts etc. can be given in code numbers or letters; a setting of the device to a corresponding number or letter then causing the device to automatically reflect, visually, the forecast weather.

An additional object of the invention is to provide a weather indicator, for the purpose described, which comprises front and rear discs with a novel dial assembly therebetween; the front disc being ported or windowed in a manner to register with predetermined parts of the dials upon which the necessary indicia appears.

A further object of the invention is to produce a simple and inexpensive weather indicator, and yet one which will be exceedingly effective for the purpose for which it is designed.

These objects are accomplished by means of such structure and relative arrangement of parts as will fully appear by a perusal of the following specification and claim.

Figure 1:
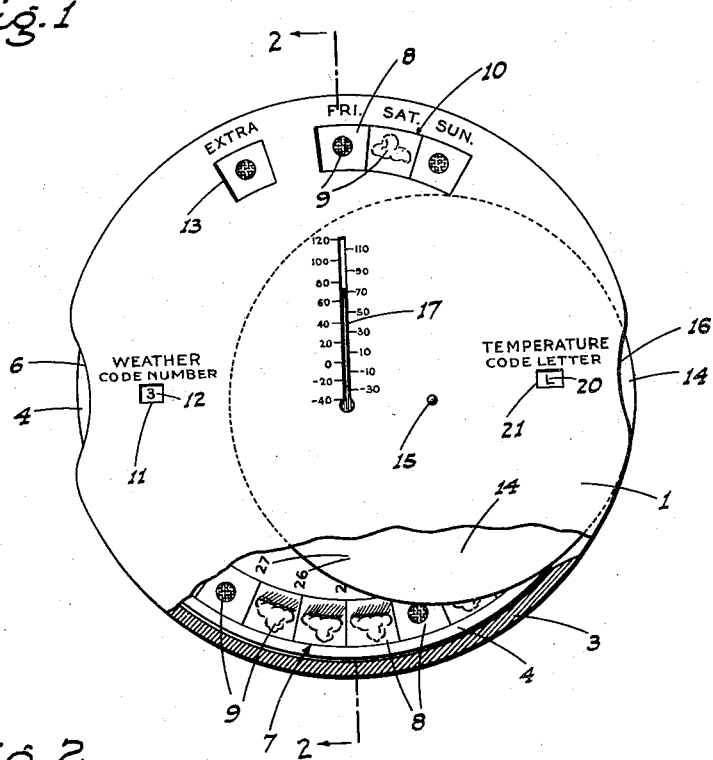
Fig. 1 is a front elevation of the device.
Figure 2:
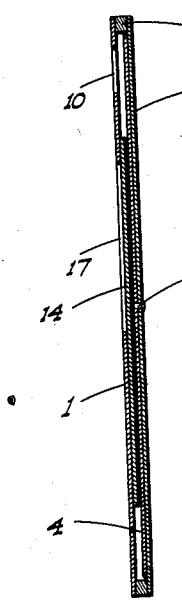
Fig. 2 is a cross section on line 2—2 of Fig. 1.
Figure 3:
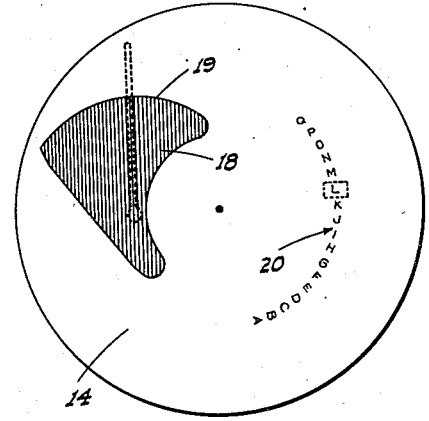
Fig. 3 is an elevation of the smaller dial, detached, but showing in dotted lines the relative positions of the cooperating window and slot in the front disc of the device.

Referring now more particularly to the characters of reference on the drawings, the device is circular and relatively thin, comprising a front disc 1 and a rear disc 2 secured together, at the periphery, by an annular spacer 3 which holds said discs 1 and 2 in spaced relation between adjacent faces thereof. This front disc 1 is in effect a face plate.

A relatively large dial 4 is disposed between the discs 1 and 2, and is centrally pivoted, as at 5, to the rear disc 2 for rotation. At one side of the device, the discs 1 and 2 are matchingly cut away, as at 6, to permit of finger engagement with the large dial 4 to rotate the same.

On its face, and adjacent but short of its periphery, the large dial 4 is formed with an annular row of weather indicia concentric to the pivot 5; such row being indicated generally at 7.

The row 7 of weather indicia is divided into a multiplicity of equal segments 8, and each segment 8 has imprinted therein an indicia 9 representing a weather condition, such as "sunny," "cloudy," or "rainy," as illustrated.

Adjacent the top of the device the front disc 1 is formed with an arcuate window 10, which overlies the annular row 7 of weather indicia; such window being of a length to register with a plurality of the segments 8, here three in number. Such segments 8 each represent a day, and thus the representation of three days may register with the arcuate window at the same time. Adjacent the window 10 the disc 1 is imprinted, on its face, with the names of three days, here "Friday," "Saturday," and "Sunday," the spacing of the names being such that they aline with the three segments 8 exposed through said window.

Adjacent the cut-away part 6 of the front disc 1, the latter is formed with a relatively small viewing port 11 disposed to register, one at a time, with a row 12 of numbers on the face of the large dial 4 inwardly of the annular row 7 of weather indicia; the numbers bearing predetermined relation to the segments 8. These are the code numbers for a three-day weather forecast, and the indicia 9 are disposed in the row 7 in predetermined groups of three corresponding to certain numbers. For example, the number "3" represents three days, wherein the first and last days are sunny, but the intermediate day is cloudy. The relation of the numbers in the row 12 to the indicia 9 in the row 7 is such that when the number "3" is brought into register with the viewing port 11, the indicia 9 corresponding to the three-day weather forecast appears in the arcuate window 10.

It is proposed that the weather forecasts for three-day periods be broadcast or published in code numbers corresponding to the numbers of the row 12. Thus, a user of the device merely rotates the large dial 4 until the forecast code number appears in the viewing port 11, and this automatically brings into register a visual representation of the forecast in the arcuate window 11. This not only provides a forecast in a novel and convenient manner, but so that it may be readily understood by the layman.

If it is desired, another window 13 may be formed in the front disc 1 beyond one end of the window 10 to likewise register with the annular row 7 of weather indicia; this extra window 13 being only the length of one segment 8, and thus registering with a single weather forecast indicia 9. This single window 13 is of course usable for one-day forecasts, and a corresponding code number of the row 12 would be broadcast, or published.

Also mounted between the front disc 1 and rear disc 2 is a smaller dial 14 disposed in front of the larger dial 4, and in position so that it does not obstruct either of the windows 10 or 13, or the viewing port 11. This is accomplished by pivoting the small dial 14 at an offset point, as at 15; the small dial being pivoted to the front disc 1, whereas the large dial 4 is pivoted to the back disc 2, as previously described.

On the side of the device opposite the cut-a-way 6, there is another cut-a-way 16, through which a peripheral portion of the small dial 14 is accessible for finger engagement to turn said dial.

Generally centrally thereof, and extending in a radial direction, the front disc 1 is formed with a slot 17 shaped to represent, for example, a thermometer; there being temperature readings on the face of the front disc 1 along said slot. On its face the small dial 14 is provided with a colored area 18, preferably red; the effective edge 19 of the area 18 extending transversely of the direction of rotation so that upon rotation of the small dial 14, the effective edge 19 rides up or down relative to the slot 17, with a portion of said area 18 exposed through the slot below such edge. This provides the visual effect of a thermometer, and by setting the small dial 14 in a given position, a corresponding temperature reading is had along the slot 17.

On the side opposite the colored area 18, the face of the small dial 14 includes an arcuate row 20 of letters concentric to the pivot 15; the front disc 1 having a viewing port 21 through which the letters of row 20 are adapted to register, one at a time.

The letters of the row 20 are so disposed that each thereof corresponds to a predetermined temperature setting of the small dial 14; i. e. a predetermined temperature reading of the effective edge 19 in the slot 17.

It is proposed that in weather forecasts, as broadcast or published, that the forecast temperature be given in one of the code letters, as in the row 20. Thus, the user need only set the small dial 14, with the forecast code letter reading in the viewing port 21. With such setting, the effective edge 19 automatically provides the forecast temperature reading through the slot 17.

Instead of reading in terms of forecast temperature, the slot and dial arrangement just described can be made to read in terms of snow depth for winter sports, or in rain gauge readings or the like for general weather information.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described the invention the following is claimed as new and useful, and upon which Letters Patent are desired:

A device for displaying weather conditions predicted for one or more consecutive days, such device comprising a card constituting the face of the device, an arcuate window formed in the card, a viewing port formed in the card separate from the window, names of a predetermined group of days of the week imprinted on the face of the card and circumferentially spaced about the arcuate window, a disc pivoted to the card and lying underneath the same, the disc being provided with a plurality of segmental divisions depicted on its face and disposed circumferentially adjacent its perimeter, said divisions being arranged in groups each group including a number of divisions corresponding to the number of days depicted on the card, variant weather conditions being indicated on each such group of divisions, a plurality of numerals imprinted on the face of the disc concentric with the axis thereof and arranged to be successively brought into register with the viewing port, each of such members being a code number for one group of the segmental divisions, the relative position of the divisions and numerals on the disc being such that when a given numeral is visible through the viewing port a corresponding group of divisions will be visible through the slot adjacent the designation of the group of days with each division of the group being in register with one of the day designations.

STEPHEN E. BLEWETT.

REFERENCES CITED

The following references are of record in the file of this patent:

UNITED STATES PATENTS

| Number | Name | Date |
|---|---|---|
| 509,891 | Gore | Dec. 5, 1893 |
| 1,728,584 | Wright | Sept. 17, 1929 |
| 2,210,315 | Verry | Aug. 6, 1940 |
| 2,394,287 | Bludworth | Feb. 5, 1946 |
| 2,455,209 | Anderson | Nov. 30, 1948 |